(12) United States Patent
Lee

(10) Patent No.: US 8,786,142 B2
(45) Date of Patent: Jul. 22, 2014

(54) LINEAR MOTOR

(75) Inventor: Sangseok Lee, Pyeongtaek-si (KR)

(73) Assignee: Sunjin Royal Motion Co., Ltd., Suwon-Si (KR)

( * ) Notice: Subject to any disclaimer, the term of this patent is extended or adjusted under 35 U.S.C. 154(b) by 295 days.

(21) Appl. No.: 13/498,207

(22) PCT Filed: Sep. 16, 2010

(86) PCT No.: PCT/KR2010/006340
§ 371 (c)(1),
(2), (4) Date: Apr. 10, 2012

(87) PCT Pub. No.: WO2011/037360
PCT Pub. Date: Mar. 31, 2011

(65) Prior Publication Data
US 2012/0187779 A1    Jul. 26, 2012

(30) Foreign Application Priority Data
Sep. 25, 2009  (KR) .................. 10-2009-0090806

(51) Int. Cl.
*H02K 41/03*    (2006.01)
(52) U.S. Cl.
USPC ........................................... 310/12.26
(58) Field of Classification Search
USPC ............... 310/12.26, 12.24, 12.22, 12.17
See application file for complete search history.

(56) References Cited

U.S. PATENT DOCUMENTS

| | | | |
|---|---|---|---|
| 7,218,018 B2 * | 5/2007 | Hasegawa et al. | 310/12.33 |
| 7,242,118 B2 * | 7/2007 | Sakamoto | 310/15 |
| 7,352,088 B2 * | 4/2008 | Qiu | 310/12.21 |
| 2005/0023905 A1 * | 2/2005 | Sakamoto | 310/12 |
| 2008/0001483 A1 * | 1/2008 | Kitamura et al. | 310/12 |
| 2010/0038976 A1 * | 2/2010 | Qiu | 310/12.24 |

FOREIGN PATENT DOCUMENTS

| | | |
|---|---|---|
| JP | 2002-354780 A | 12/2002 |
| JP | 2008-187824 A | 8/2008 |
| JP | 2008-193760 A | 8/2008 |
| KR | 10-1998-0025941 A | 7/1998 |

OTHER PUBLICATIONS

International Search Report dated May 16, 2011 issued in Application No. PCT/KR2010/006340.

* cited by examiner

*Primary Examiner* — Hanh Nguyen
(74) *Attorney, Agent, or Firm* — Ked & Associates, LLP

(57) ABSTRACT

A linear motor comprises a first member including armature modules, a second member including permanent magnet modules, and a supporting mechanism. Each armature module has at least four salient poles projected from a magnetic body to the second member and coils winding round the salient poles, through which a single-phase current flows. Each permanent magnet module has as many permanent magnets as the number of the salient poles included in each armature module. Currents having a predetermined phase difference are applied to the armature modules such that a thrust according to a traveling magnetic field is generated in a unit composed of S armature modules and P (P is a multiple of 2) permanent magnet modules arranged in a moving direction. A stator corresponding to one of the first and second members is fixed to the supporting mechanism such that a mover corresponding to the other moves by the thrust.

18 Claims, 10 Drawing Sheets

(Circular core)

Through-holes
(Rectangular core)

(Cross section of
8-slot type motor)

(8-slot type stratified core)

LINEAR MOTOR

This nonprovisional application claims priority under 35 U.S.C. §119(a) on Patent Application No. 10-2009-0090806 filed in Republic of Korea on Sep. 25, 2009 the entire contents of which are hereby incorporated by reference.

BACKGROUND

1. Field

This document relates to a linear motor generating a rectilinear motion.

2. Related Art

In general, a linear motor has a structure that generates a thrust between a mover and a stator that face each other in a straight line. A permanent magnet type linear motor is constructed in such a manner that a fixed magnet is arranged at one of a mover and a stator and alternating multi-phase power is applied to the other to generate an electromagnetic force between the motor and the stator so as to produce a thrust.

A conventional linear motor has a structure that a rotary motor is unfolded and arranged in a straight line, and thus a strong magnetic pull is generated between a salient pole of an armature core and a permanent magnet. Accordingly, system accuracy is decreased and wear and tear on a supporting tool that maintains a predetermined gap becomes very serious.

SUMMARY

An aspect of this document is to provide a linear motor for preventing generation of a magnetic pull in a plate type linear motor and widening the effective area of a gap between a salient pole of an armature core generating a thrust and a permanent magnet facing the salient core so as to improve the efficiency.

In an aspect, a linear motor comprises a first member including armature modules, a second member including permanent magnet modules, and a supporting mechanism, wherein each armature module has at least four salient poles projected from a ring-shaped magnetic body to the second member and coils winding round the salient poles, through which a single-phase current flows, each permanent magnet module has as many permanent magnets as the number of the salient poles included in each armature module, currents having a predetermined phase difference are applied to the armature modules such that a thrust according to a traveling magnetic field is generated in a unit composed of S armature modules and P (P is a number corresponding to a multiple of 2) permanent magnet modules arranged in a moving direction, and a stator corresponding to one of the first member and the second member is fixed to the supporting mechanism such that a mover corresponding to the other is moved by the thrust.

In another aspect, a linear motor comprises a first member including armature modules, a second member including magnetic modules, and a supporting mechanism, wherein each armature module has at least four salient poles projected from a ring-shaped magnetic body to the second member and coils winding round the salient poles, through which a single-phase current flows, each magnetic module has as many second salient poles as the number of the salient poles included in each armature module, currents having a predetermined phase difference are applied to armature modules such that a thrust according to a traveling magnetic field is generated in a unit composed of S armature modules and P magnetic modules arranged in a moving direction, and one of the first member and the second member is fixed to the supporting mechanism such the other is moved while maintaining a predetermined gap between each salient pole and a second salient pole corresponding thereto.

In each armature module the coils may wind round the salient poles such that an arbitrary salient pole is different from two neighboring salient poles in its polarity.

The permanent magnets in each permanent magnet module may be arranged such that an arbitrary permanent magnet is different from two neighboring permanent magnets in its polarity.

The permanent magnets of each permanent magnet module may be fixed to the surface of the magnetic body of the permanent magnet module or embedded in the magnetic body of the permanent magnet module.

Neighboring permanent magnet modules may be separated from each other by a predetermine distance or have a non-magnetic body interposed between the permanent magnet modules.

The cross-sectional structure of the armature module may be symmetrical, and the magnetic body of each armature module may have a circular ring shape or a polygonal ring shape.

The salient poles of each armature module may be arranged on the magnetic body point-symmetrically or axi-symmetrically.

The second member may be located inside or outside the first member. The salient poles of each armature module may be formed inside the magnetic body when the second member is located inside the first member and the salient poles of each armature module may be formed outside the magnetic body when the second member is located outside the first member.

A pipe may be inserted into the permanent magnet modules in the moving direction to assemble the second member.

Each permanent magnet in the permanent magnet module may be different from two permanent magnets adjacent in the moving direction in its polarity.

The length of the first or second member may be greater than the length of the unit composed of the S armature modules and the P permanent magnet modules.

The S may be determined by one of multiples of a constant that determines the predetermined phase difference, and the S may be an odd number equal to or greater than 3. The constant may be 3 and (S, P) may correspond to one of (3, 2), (3, 4), (9, 8), and (9, 10). If the constant is 3, S is 9, and three currents having a phase difference of 120° are respectively U, V and W, or UuUVvVWwW may be respectively applied to nine continuous armature modules (here, small letters represent phases opposite to those of currents represented by capitals).

The magnetic body of each armature module may have a stratified form.

The linear motor according to an embodiment of the present invention can prevent a guide from being worn out due to a magnetic pull frequently generated in a plate type linear motor and obtain a large-capacity thrust or a high conveying speed although the linear motor has a small size. Furthermore, components of the linear motor are modularized, and thus the linear motor can be easily assembled and modified into various forms.

BRIEF DESCRIPTION OF THE DRAWINGS

The implementation of this document will be described in detail with reference to the following drawings in which like numerals refer to like elements.

DETAILED DESCRIPTION

Hereinafter, an implementation of this document will be described in detail with reference to the attached drawings.

A linear motor according to an embodiment of the present invention may include a first member, a second member, and a supporting mechanism.

Figure 1:
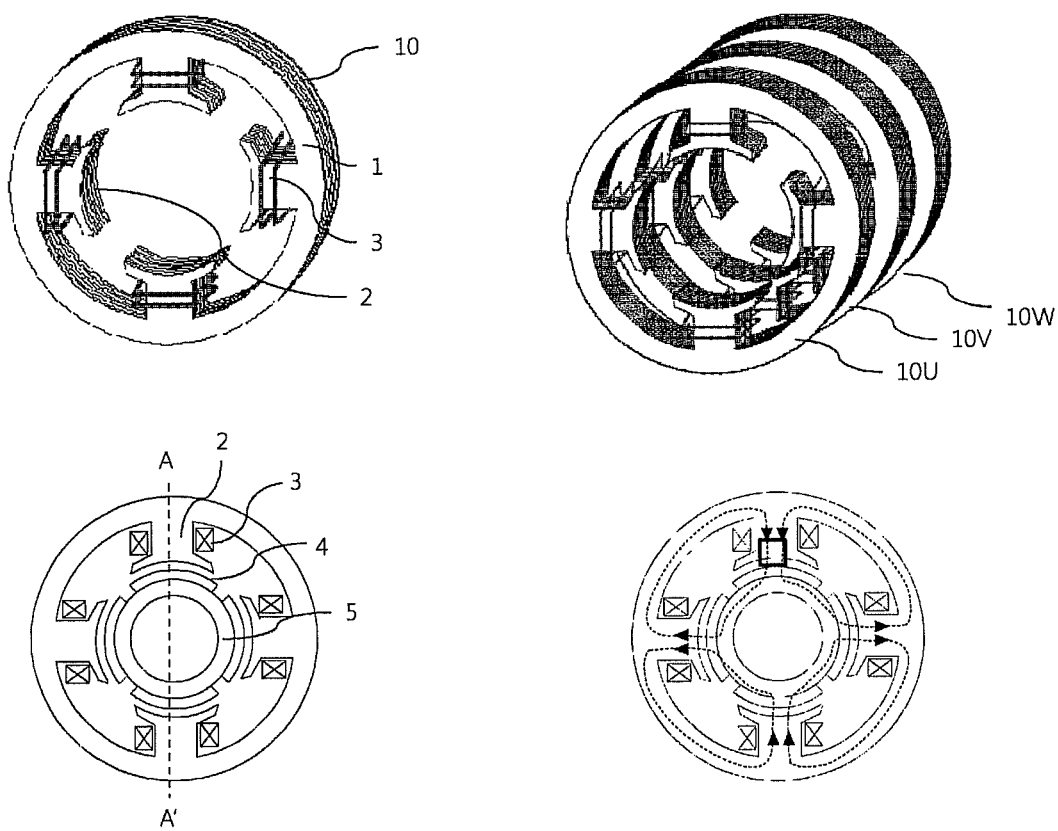
FIG. 1 illustrates an armature module of an inner magnet type linear motor according to an embodiment of the present invention.
Figure 2:
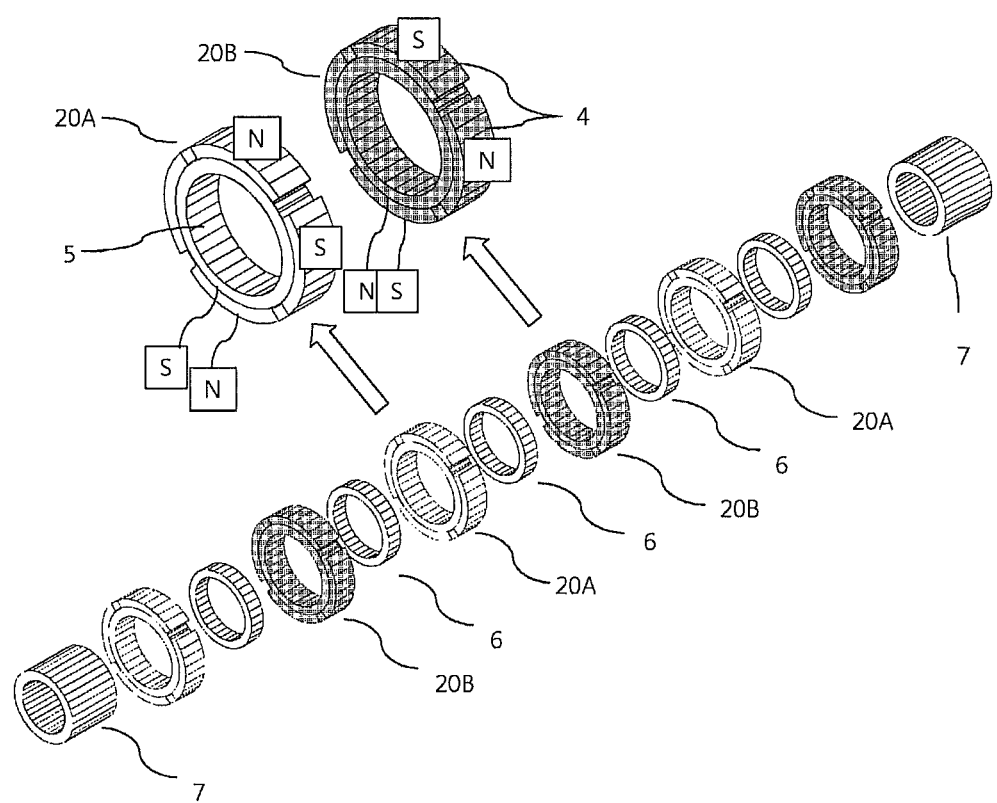
FIG. 2 illustrates a permanent magnet module of the inner magnetic type linear motor according to an embodiment of the present invention.

FIGS. 1 and 2 respectively illustrate an armature and a permanent magnet of an inner magnet type linear motor according to an embodiment of the present invention.

Referring to FIG. 1, the first member includes armature modules 10 arranged in a line in a moving direction. Each armature module 10 has a ring-shaped magnetic core 1, at least four salient poles 2 projected from the magnetic core 1 in radial directions, and coils 3 winding round the salient poles 2. Here, the ring shape is not limited to a circular ring and may include rectangular and octagonal rings that form a closed circuit.

Referring to FIG. 2, the second member includes permanent magnet modules 20 arranged at predetermined intervals. Each permanent magnet module 20 includes permanent magnets 4 formed in the circumferential direction. Here, the number of the salient poles 2 is identical to the number of the permanent magnets 4.

Current is supplied to the coils 3 of each armature module 10 such that a traveling magnetic field is formed in the salient poles 2 with the coils 3 winding round them. Here, the coils 3 of at least one of the armature modules 100 may be provided with a current having a phase different from a phase or phases of currents supplied to the coils of the other armature modules 10 such that a moving thrust is generated due to an attractive force and a repulsive force between electromagnetic poles formed at the ends of the salient poles 2 and the permanent magnets 4 corresponding to the electromagnetic poles.

The supporting mechanism uses one of the first and second members as a stator, uses the other as a mover and is connected to the stator to allow the mover and the stator to relatively move while maintaining a predetermined gap between the salient poles 2 of the armature modules 10 and the permanent magnets 4 of the permanent magnet modules 20.

FIGS. 1 and 2 illustrate an embodiment in which the second member composed of the permanent magnet modules 20 is located inside and the first member composed of the armature modules 10 is arranged outside.

The electromagnetic polarities of neighboring salient poles 2 in each armature module 10 are different from each other such that a high-density magnetic flux smoothly flows between the salient poles 2 and the permanent magnets 4 corresponding to the salient poles 2. If the armature module 10 has four salient poles 2, for example, the coils 3 may wind round the salient poles 2 such that the first and third salient poles arranged clockwise from a predetermined reference point have the same polarity and the second and fourth salient poles arranged clock wise from the predetermined reference point have the same polarity when a single-phase current flows through the coils 3.

For example, as shown in FIG. 1, a magnetic flux emitted from the first or third salient pole passes through the first or third permanent magnet corresponding to the first or third salient pole, a permanent magnet yoke 5, second and fourth permanent magnets, is applied to the second and fourth salient poles, passes through the core 1 and then is applied to the first and third salient poles to form a magnetic flux closed loop. Furthermore, the assembly efficiency of the armature module 10 can be improved by winding the coils 3 through which a single-phase current flows round the salient poles 2 of the armature module 10 while changing a winding direction. The coils 3 may be connected to each other with one line.

When the linear motor is applied to a place where a moving speed of the mover is not high, the frequency of power supplied to the coils 3 is not high, and thus the linear motor can be manufactured while the core 1 is not stratified. Accordingly, the manufacturing cost is decreased and mass production of the linear motor with high durability can be achieved. When the linear motor requires a high conveying speed, the frequency of the power supplied to the coils 3 is high. Accordingly, the core 1 is manufactured in a stratified form, and thus eddy current loss and hysteresis loss generated in the core 1 can be reduced.

In each permanent magnet module 20, as shown in FIG. 2, as many permanent magnets 4 as the number of the salient poles 2 of the armature module 10, that is, an even number of equal to or more than four permanent magnets 4, are arranged in the circumferential direction and fixed to the yoke 5 that is a ferromagnetic body such that neighboring permanent magnets 4 have different polarities. Here, the permanent magnets 4 are magnetized in the central direction, that is, the radial direction, such that a magnetic flux radiated from the salient poles 2 with the coil 3s winding round them is applied to the yoke 5 through the permanent magnets 4 respectively corresponding to the salient poles 2 or a magnetic flux radiated from the permanent magnets 4 is applied to the salient poles 2 respectively corresponding to the permanent magnets 4. That is, the permanent magnets 4 are magnetized into outer N pole/inner S pole or outer S pole/inner N pole. The magnetic field of the permanent magnets 4 is formed in the radial direction which is perpendicular to a direction in which a thrust is generated (moving direction of the mover), and thus the efficiency of the magnetic circuit is enhanced.

Neighboring permanent magnet modules 20A and 20B shown in FIG. 2 are separated from each other having a predetermined space between the two permanent magnet modules 20A and 20B or have a nonmagnetic spacer 6 interposed between the two modules 20A and 20B and arranged such that two permanent magnets 4 located corresponding to each other in the circumferential direction have different polarities. For example, the permanent magnet module 20A includes the permanent magnets 4 sequentially arranged in the order of N, S, N and S poles from a reference point of the circumferential direction and the permanent magnet module 20B neighboring the permanent magnet module 20A includes the permanent magnets 4 sequentially arranged in the order of S, N, S and N poles from the reference point. An end stator 7 may be arranged at both ends of the second member.

Figure 3:
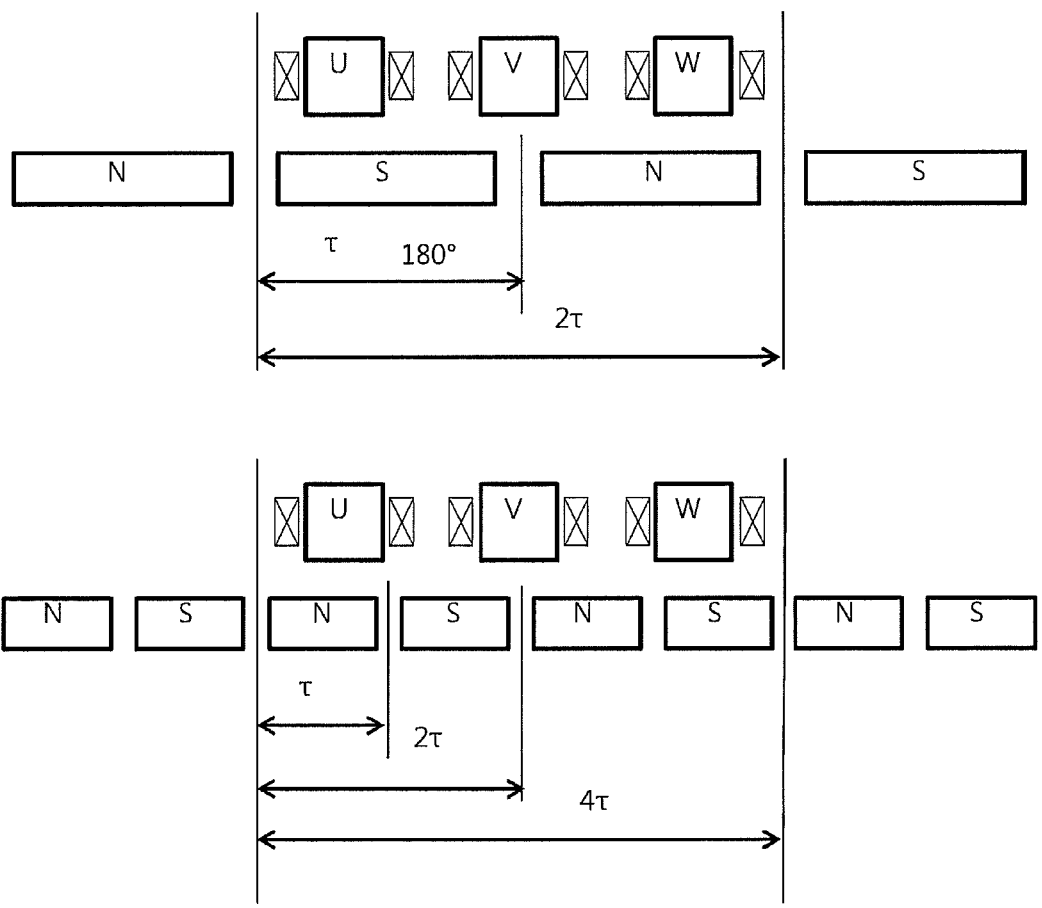
FIG. 3 illustrates the fundamentals of generating a rectilinear thrust according to a combination of the armature modules shown in FIG. 1 and the permanent magnet modules shown in FIG. 2.

FIG. 3 illustrates the fundamentals of generating a rectilinear thrust according to a combination of at least two armature modules 10 and at least two permanent magnet modules 20 shown in FIGS. 1 and 2 and shows parts of a cross-sectional view taken along line A-A' of FIG. 1.

In FIG. 3, U, V and W represent salient poles 2 located in the same position based on the circumferential direction in the armature modules 10U, 10V and 10W shown in FIG. 1 and arranged in the moving direction, and S and N represent permanent magnets 4 arranged facing the salient poles U, V and W.

Since a single-phase current is supplied to the coils 3 of each armature module 10, as described above with reference to FIG. 1, 3-phase currents may be applied to a set of the three armature modules 10U, 10V and 10W. That is, currents having a phase difference of 120° to each other are respectively supplied to the coils of the armature modules 10U, 10V and 10W.

As shown in FIG. 3, when the pole pitch of the permanent magnets S and N alternately arranged in the moving direction is τ (½ period, 180°), the three armature modules 10U, 10V and 10W are arranged at an interval corresponding to ⅔τ (120°).

While an AC current with a peak value is flowed through the coil winding round the salient pole V located between the permanent magnets S and N in a positive (+) direction, and thus the salient pole V becomes an N pole, an AC current with a magnitude corresponding to peak value/square root of 2 is flowed through the coils winding round the salient poles U and W in a negative (−) direction, and thus the salient poles U and W become S poles. Accordingly, an attractive force is generated between the salient pole V corresponding to the N pole and the permanent magnet S and a repulsive force is generated between the salient pole V and the permanent magnet N so as to move the permanent magnets to the right. Although a repulse force and an attractive force are respectively generated between the permanent magnets S and N and the salient poles U and W that become the S poles according to a magnetic force smaller than that of the salient pole V corresponding to the N pole, the attractive force and the repulsive force are cancelled each other, and thus the salient poles U and W do not affect the movement of the permanent magnets.

The permanent magnets are moved by ⅔ pole pitch, and thus the salient pole W is located between the permanent magnets S and N. In this state, when a current of which the phase advances by 120° is flowed through the coil of each salient pole and a current with the peak value is flowed through the coil winding round the salient pole W in the positive direction, the salient pole W becomes an N pole. In addition, an AC current with the magnitude corresponding to the peak value/square root of 2 is flowed through the coils winding round the salient poles U and V in the negative direction such that the salient poles U and V become S poles. Accordingly, an attractive force is generated between the salient pole W corresponding to the N pole and the permanent magnet S and a repulsive force is generated between the salient pole W and the permanent magnet N so as to move the permanent magnets to the right. The salient poles U and W that become the S poles according to a magnetic force smaller than that of the salient pole V corresponding to the N pole respectively produce a repulsive force and an attractive force on the permanent magnets S and N. However, the attractive force and the repulsive force are cancelled each other.

The aforementioned operation is repeated to move the permanent magnets to the right. That is, the 3-phase currents applied to the armature modules generate a traveling magnetic field in the salient poles, and thus a thrust that moves the magnets to the right is generated.

Although description has been made on the assumption that the coils wind round the salient poles U, V and W in the same direction, coils may wind round salient poles of neighboring armature modules, which correspond to each other, in opposite directions. That is, the coils may wind round the salient poles U and V in the same direction and the coil may wind round the salient pole V in a direction opposite to the winding direction of the coils winding round the salient poles U and W. Even in this case, currents having a phase difference can be supplied to generate a thrust that moves the permanent magnets in the same direction.

In an ideal case, the thrust for moving the permanent magnets is proportional to the sum of surface areas of contact portions of the salient poles and the permanent magnets, the number of armature modules 10 arranged in the moving direction, the magnitude of current applied to the coils, coil turns of the coils winding round the salient poles, and the magnitude of the magnetic force of each permanent magnet.

The first example of FIG. 3 shows a basic combination of 3-phase armature modules and 2-pole permanent magnets and the second example of FIG. 3 shows a combination of 3-phase armature modules and 4-pole permanent magnets. These two examples have the same fundamentals of generating a thrust. Furthermore, a combination of 3-phase armature modules and 8-pole permanent magnets is also available. That is, a thrust is generated based on a combination of the number S of armature modules, which corresponds to a multiple of a motor constant, and the number P of permanent magnet modules, which corresponds to a multiple of 2 (N and S poles). Here, the motor constant is 3 if the armature modules are driven with 3-phase power and 5 if the armature modules are driven with 5-phase power. An odd-numbered motor constant equal to or greater than 3 is generally used and a phase difference of currents applied to the coils of each armature module is determined by the motor constant.

Here, ripples in the thrust decrease as the least common multiple of S and P increases. Furthermore, as the ratio of S to P, that is a winding factor, becomes close to 1, symmetry efficiency of the magnetic circuit increases. Table 1 shows combinations of armature modules and permanent magnet modules in the case of a 3-phase motor. A combination of 9 armature modules and 8 or 10 permanent magnets is advantageous in terms of efficiency and ripples.

TABLE 1

| The number of armature modules | The number of permanent magnet modules | | | |
|---|---|---|---|---|
| 3 | 2 | 4 | | |
| 6 | 4 | 8 | | |
| 9 | 6 | 8 | 10 | 12 |
| 12 | 8 | 10 | 14 | 16 |

When the length (length in the moving direction) of a region in which the S armature modules face the P permanent magnet modules having a gap between the armature modules and the permanent magnet modules is referred to as a unit length of the motor, an effective distance capable of generating a thrust that moves the mover can be secured only when one of the first member composed of multiple armature modules and the second member composed of multiple permanent magnet modules is longer than the unit length. That is, the effective distance for generating the thrust can be secured only when the length of the overlap portion of the first member and the second member is longer than the unit length (when the number of the armature modules is equal to or greater than S or the number of the permanent magnet modules is equal to or greater than P), and the thrust can increase in proportion to the length of the overlap portion.

The motor can be driven with 2-phase power. In this case, the thrust for moving the permanent magnets to one direction can be generated if 2-phase currents having a phase difference of 90° flow through two armature modules while the armature modules are separated from each other by τ/2.

The components of the linear motor shown in FIGS. 1 and 2 are symmetrically arranged in terms of cross section, and thus a magnetic attractive force generated caused by each armature and each permanent magnet is cancelled off and an external force is not generated on a guide for guiding the rectilinear motion of the mover, and thus the lifetime of the guide can be extended.

Figure 4:
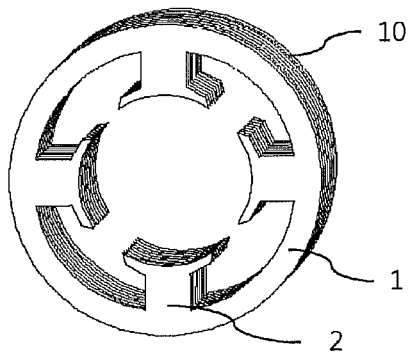
FIG. 4 illustrates armature modules of an inner magnet type linear motor according to another embodiment of the present invention.
Figure 4:
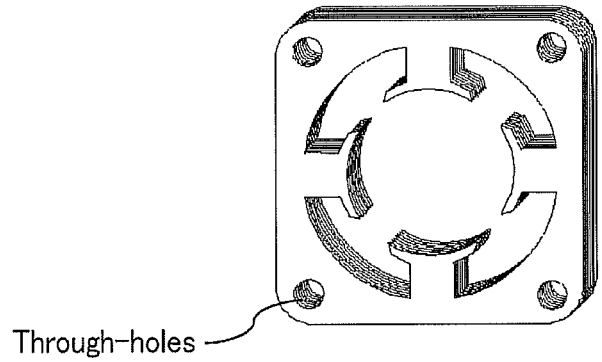
Figure 4:
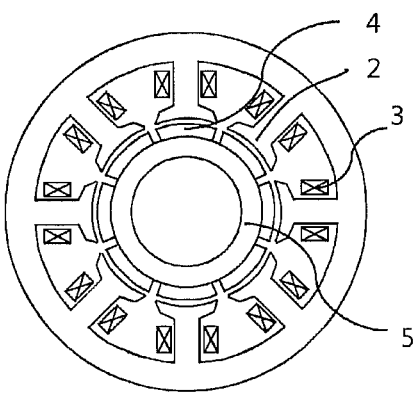
Figure 4:
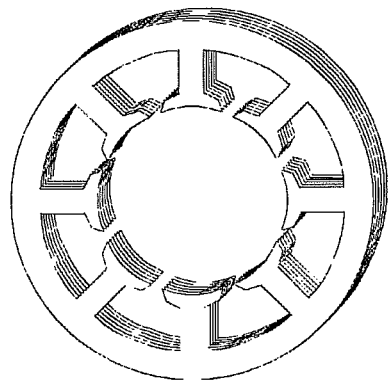

Although the core 1 of the armature module 10 shown in FIG. 1 is circular, the core 1 may have a point-symmetric or axisymmetric polygonal shape, for example, hexagonal, octagonal, and decagonal shapes. Furthermore, the core 1 may have a rectangular shape for stable posture and through-holes may be formed at the corners of the rectangular core 1 for facilitating combination of neighboring armature modules 10, as shown in FIG. 4.

FIGS. 1, 2 and 3 show the 4-slot motor having the 4 salient poles formed in the circumferential direction. In the case of a large-capacity high-speed motor that requires a large quantity of magnetic flux and a large cross-sectional area, however, the motor can be modified into an 8-slot motor having 8 salient poles. When the cross-sectional area of a salient pole is increased to raise the quantity of magnetic flux flowing through the armature module, the size of the core through which the magnetic flux flows also increases in the radial direction so as to enhance the cross-sectional area of the motor. In this case, if the number of salient poles instead of the cross-sectional area of each salient pole is increased, the quantity of magnetic flux can be enhanced while maintaining the thickness of the core, and thus it is advantageous to reduce the size of the motor and increase the thrust.

Since the first member (ferromagnetic substance identical to the material of the core) is composed of the independent armature modules which are not connected, independent magnetic fluxes having the same magnitude flow through the respective armature modules if the same power is supplied to the armature modules. Accordingly, there is a little deviation in thrusts generated through the armature modules so as to reduce ripples in the thrusts. The magnetic fluxes are uniformly distributed through the salient poles of the armature modules without being concentrated on a specific salient pole, and thus a large quantity of magnetic flux can flow even if the cores of the armature modules have a small cross-sectional area. Furthermore, since a magnetic flux of an independent magnetic circuit flows in each armature module, there is no magnetic flux flowing in the same direction as the moving direction of the mover and a magnetic flux is generated only in a direction perpendicular to the moving direction of the mover, and thus a quantity of leak magnetic flux unrelated to the thrust can be reduced and motor efficiency can be improved.

Figure 5:
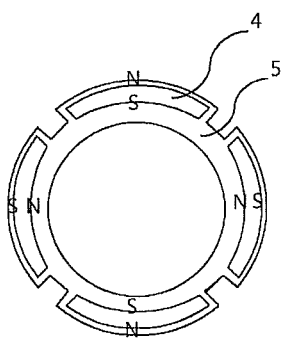
FIG. 5 illustrates permanent magnet modules of the inner magnetic type linear motor according to another embodiment of the present invention.
Figure 5:
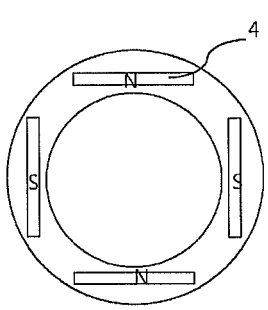
Figure 5:
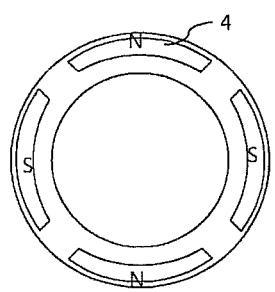

FIG. 5 is a cross-sectional view of an interior permanent magnet. While the permanent magnet module 20 shown in FIG. 2 is assembled in such a manner that the permanent magnets 4 magnetized in the radial direction are fixed to the surface of the yoke 5, the permanent magnets 4 may be embedded in the yoke 5, as shown in FIG. 5. Otherwise, the yoke 5 may be magnetized in a desired form to form the permanent magnet module 20.

Figure 6:
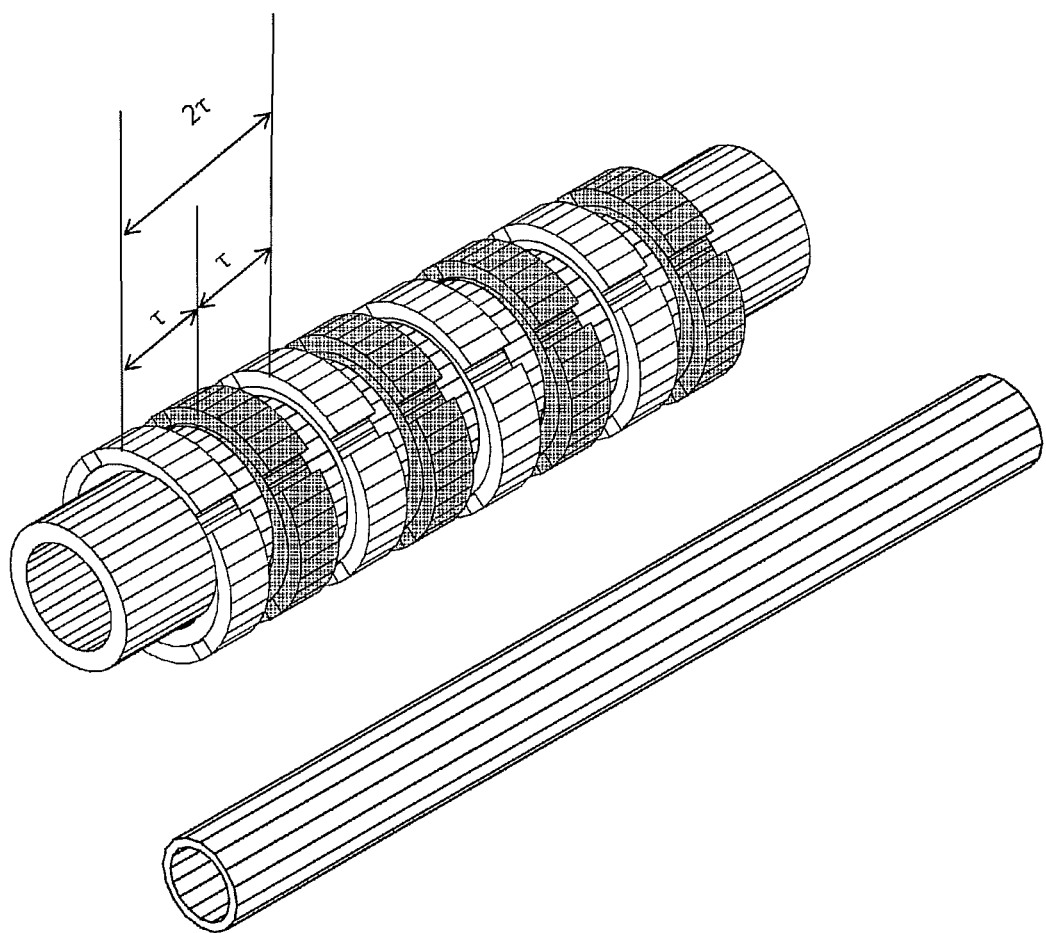
FIG. 6 illustrates a method of assembling the permanent magnet modules of the inner magnet type linear motor according to an embodiment of the present invention.

Furthermore, the second member composed of the multiple permanent magnet modules 20 may be assembled in such a manner that a pipe having an outer diameter smaller than the inner diameter of the yoke 5 of the permanent magnet module 20 by a predetermined size is inserted into the permanent magnet modules 20, as shown in FIG. 6, so as to easily assemble the second member. Otherwise, the inner shape of the of the yoke 5 may be modified into a shape other than a circle and a pipe having a cross section corresponding to the inner shape of the yoke 5 may be inserted into the permanent magnet modules 20. In this case, it can be advantageous to fix the circumferential positions of the permanent magnet modules 20.

Figure 7:
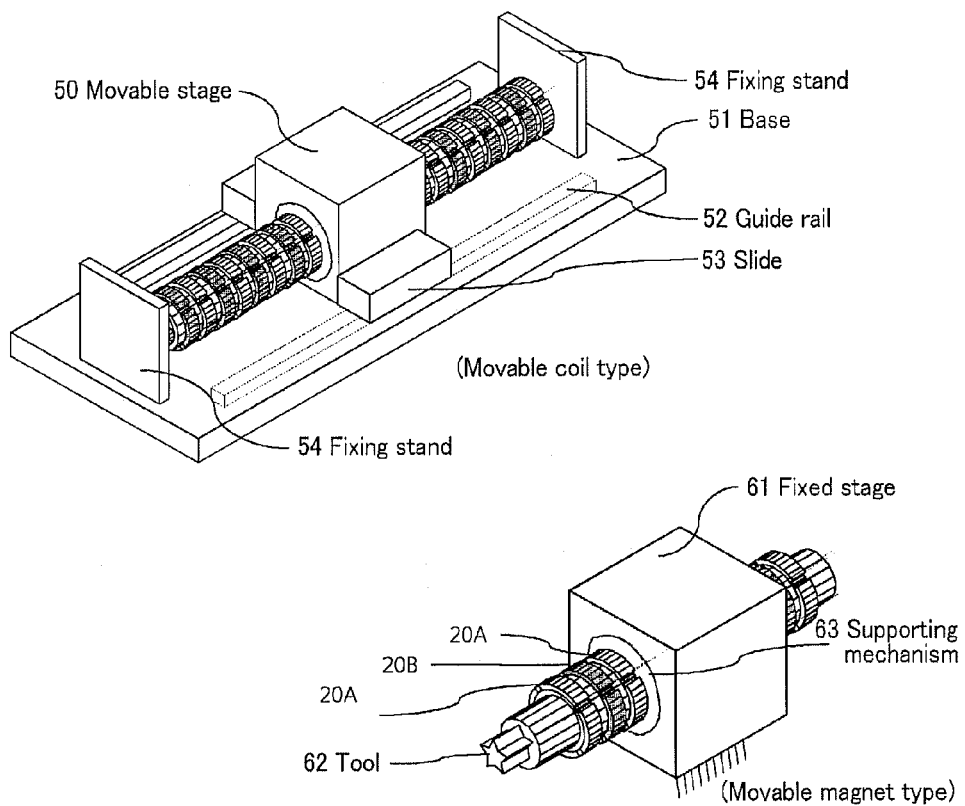
FIGS. 7 and 8 illustrate various conveying means implemented using the linear motor according to the present invention.
Figure 8:
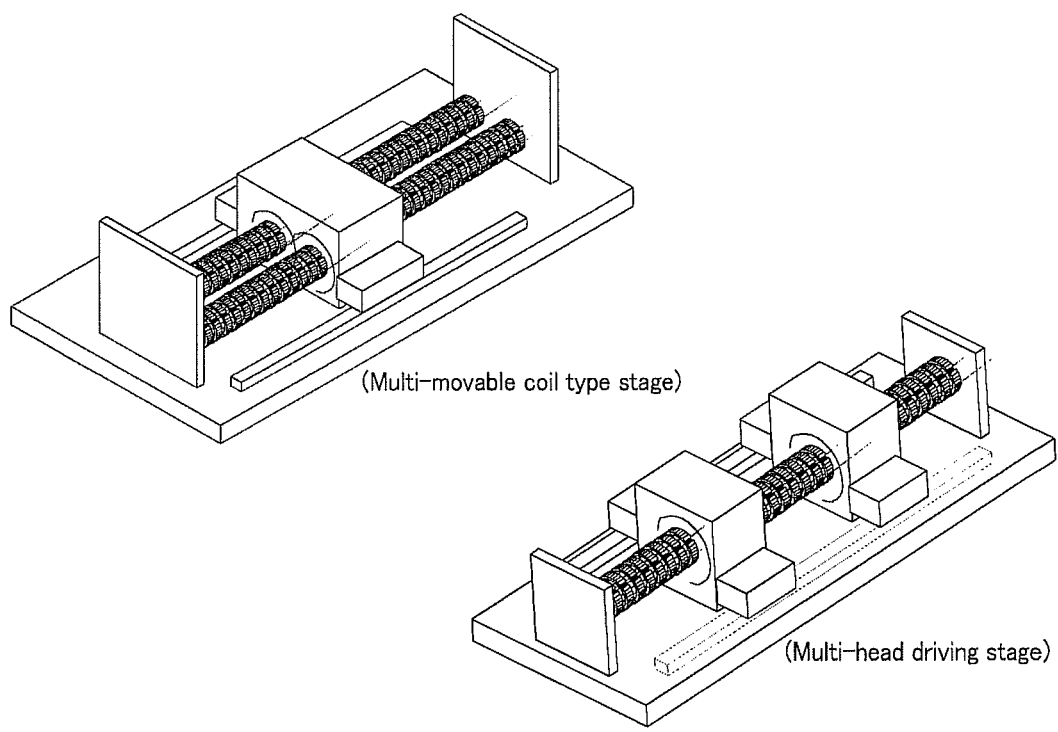

FIGS. 7 and 8 illustrate exemplary conveying means in various forms using the linear motor according to the present invention.

It is possible to construct both a conveying means (movable coil type) having the first member corresponding to a set of armature modules as a mover and having the second member corresponding to a set of permanent magnet modules as a stator and a conveying means (movable magnet type) having the first member as a stator and having the second member as a mover.

In the case of the movable coil type conveying means, both ends of the second member corresponding to the stator are fixed by two fixing stands 54 and the first member corresponding to the mover is connected to a movable stage 50 and rectilinearly moves according to a slide 53.

In the case of the movable magnet type conveying means, the first member corresponding to the stator is connected to a fixed stage 61 and fixed and a second member mover with a tool 62 connected to the end thereof maintains a predetermined gap between a salient pole of an armature module and a permanent magnet according to a supporting mechanism 63.

Referring to FIG. 8, in the case of the movable coil type, more than two first members corresponding to movers may be arranged in parallel to improve a thrust. Furthermore, more than two movers may independently move sharing the second member corresponding to a stator.

Figure 9:
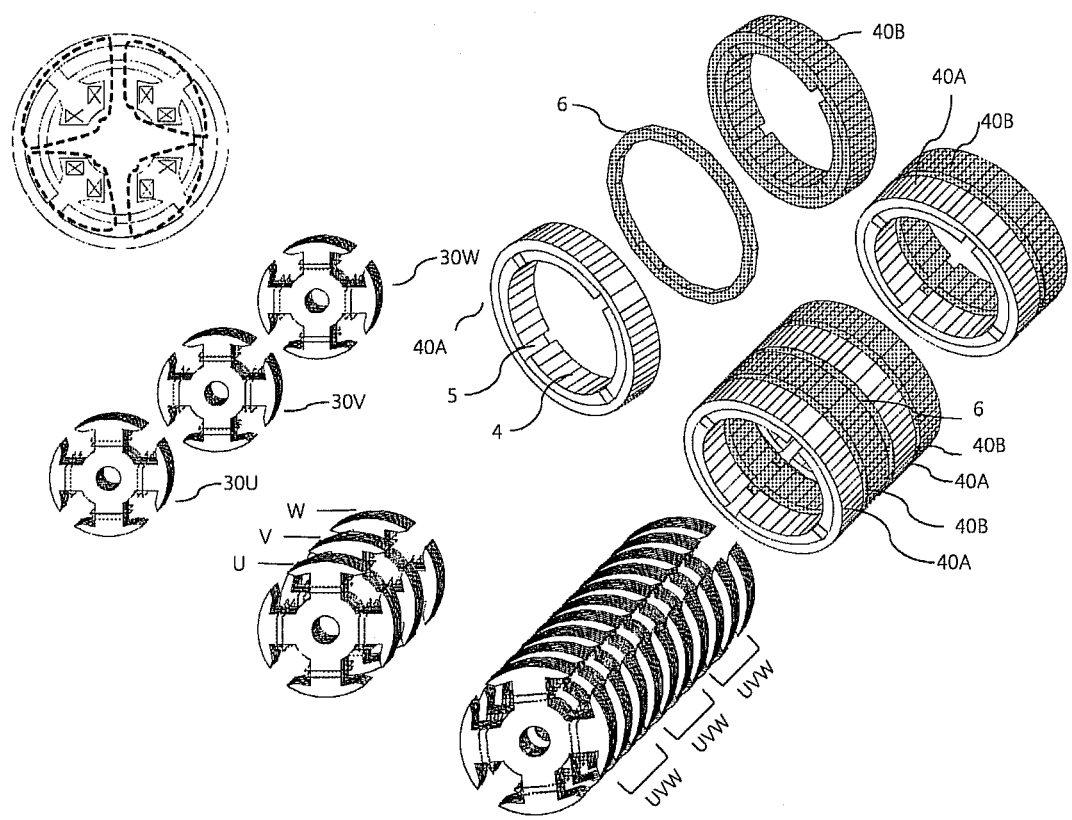
FIG. 9 illustrates an outer magnet type linear motor according to another embodiment of the present invention.

FIGS. 1 through 8 illustrate embodiments of the inner magnet type linear motor in which the first member composed of armature modules is located outside and the second member composed of permanent magnet modules is arranged inside. FIG. 9 illustrates an embodiment of an outer permanent magnet type linear motor in which armature modules are located outside and permanent magnet modules are arranged inside.

In the outer permanent magnet type linear motor, salient poles are projected in the radial direction to the outer circumference and permanent magnets corresponding to the salient poles are fixed to the inside of a ring-shaped yoke. The outer permanent magnet type linear motor has the same operating principle as that of the inner permanent magnet type linear motor.

Although 3-phase currents are applied to the armature modules 10 and 30 in the order of UVW, UVW and UVW in the moving direction in FIGS. 1 and 9, it is also possible to apply 3-phase currents to the armature modules 10 and 30 in the order of UuU, VvV and WwW. Here, small letters mean a current having a phase opposite to the phase of a current represented by capitals.

Figure 10:
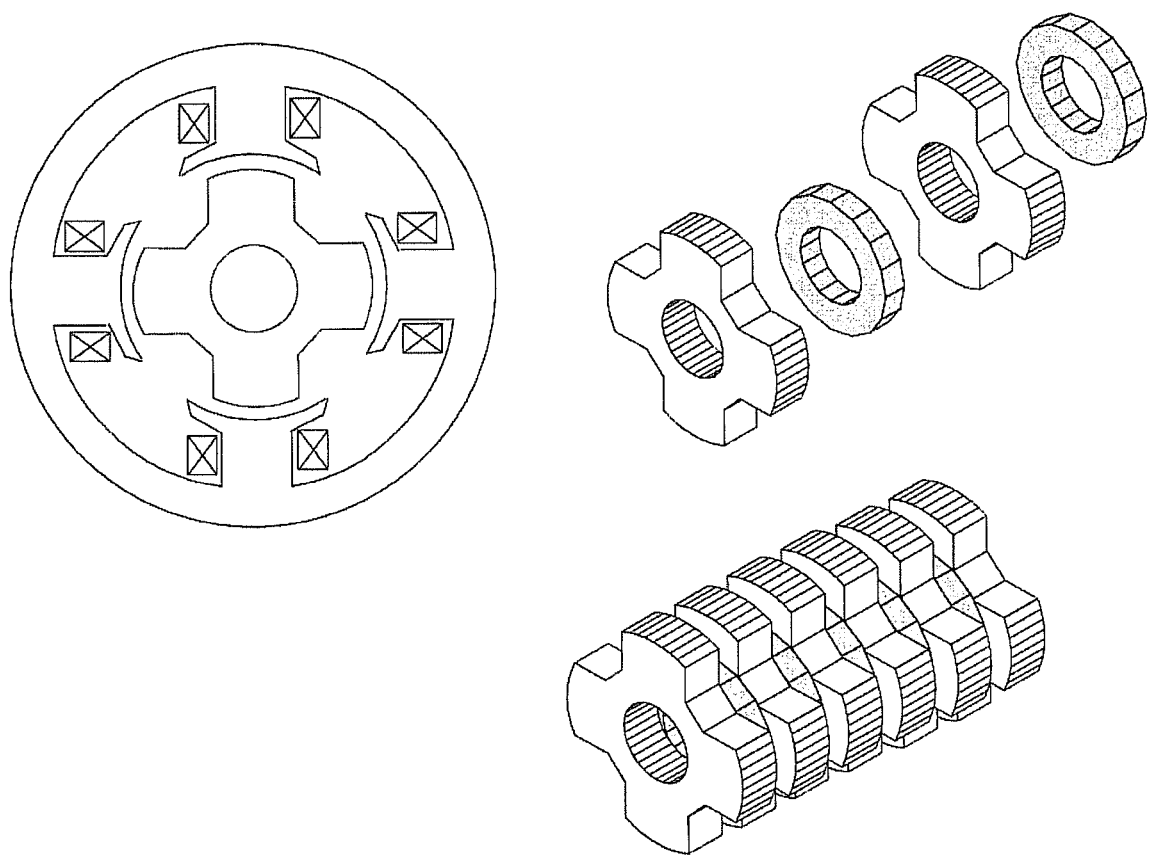
FIG. 10 illustrates a magnetless modular linear motor according to another embodiment of the present invention.

FIG. 10 illustrates a magnetless module type linear motor using magnetless modules (or magnetic modules), which have magnetic salient poles respectively corresponding to salient poles of armature modules, instead of permanent magnet modules as the second member. In the magnetless module type linear motor, neighboring magnetless modules are separated from each other by a predetermined distance or have a nonmagnetic spacer interposed therebetween. A traveling magnetic field generated by power supplied to the armature modules, for example, 3-phase power, may generate a thrust that moves the magnetless modules. When the magnetless modules are used, it is advantageous to remarkably decrease a gap between the salient poles of the magnetless modules and the salient poles of the armature modules.

In the case of a 3-phase motor, for example, if the length of one magnetless module in a moving direction and the pole pitch of the interval between two magnetless modules are $\tau$, a magnetic flux is generated in salient poles of three armature modules when the three armature modules are arranged at an interval of $\tau+\frac{2}{3}\tau$ and 3-phase currents having a phase difference of 120° are respectively flowed through the three armature modules. Here, a thrust that moves the mover in the moving direction is generated according to the principle of reducing a magnetic resistance between the salient poles of the armature modules and magnetic substances of the magnetless modules, that is, the principle that a magnetic flux radiated from the salient poles of an armature module deviated from the magnetic substance of a magnetless module by $\frac{2}{3}\tau$ is apt to vertically flow to the magnetic substance of the magnetless module (the principle of aligning the salient poles of the armature modules and the magnetic substances of the magnetless modules). A 2-phase motor may be constructed according to the fundamentals similar to the fundamentals of the 3-phase motor.

Figure 11:
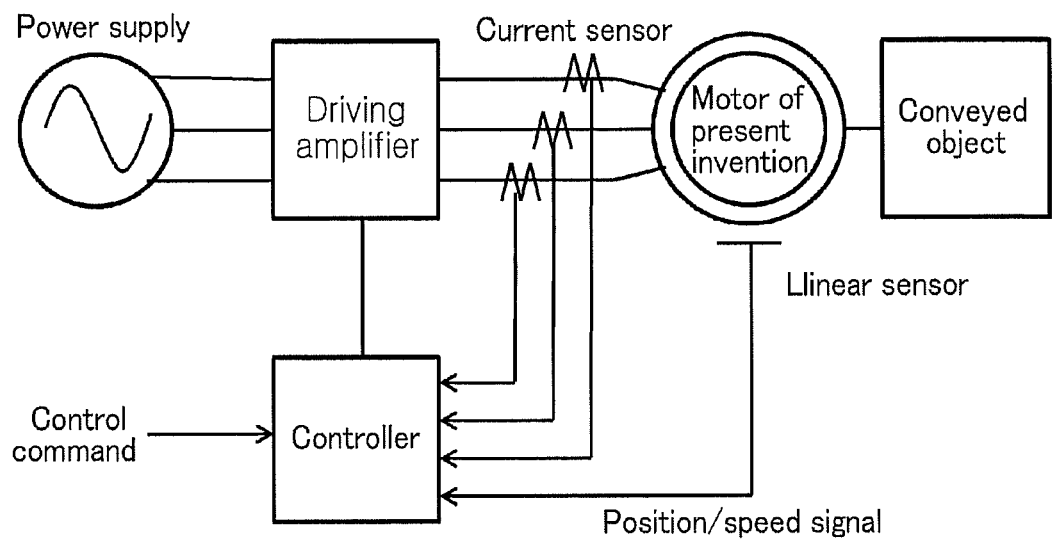
FIG. 11 illustrates a servo system for driving the linear motor according to the present invention.

FIG. 11 illustrates a configuration of a servo system driving the linear motor according to the present invention. In FIG. 11, components other than the linear motor correspond to components of a conventional linear motor.

The servo system may include a driving amplifier generating a current to be applied to the linear motor, a current sensor sensing the current supplied to the linear motor from the driving amplifier, a linear sensor sensing the position or moving speed of a mover of the linear motor, and a controller controlling the driving amplifier according to a control command based on signals sensed by the current sensor and/or the linear sensor. The driving amplifier may include a converter (not shown) converting AC power into DC power and an inverter generating a current required to drive the linear motor.

The inverter may generate power suitable to a driving method of the linear motor according to the present invention, for example, 2-phase AC current, 3-phase AC current, 2-phase rectified current, and 3-phase rectified current, and apply the generated power to the armature modules of the linear motor. The inverter may change amplitudes and frequencies of the currents according to a command of the controller to adjust the position and speed of the mover and a thrust that moves the mover.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A linear motor comprising a first member including armature modules, a second member including permanent magnet modules, and a supporting mechanism,
   wherein each armature module has at least four salient poles projected from a ring-shaped magnetic body to the second member and coils winding round the salient poles, through which a single-phase current flows,
   each permanent magnet module has as many permanent magnets as a number of the salient poles included in each armature module,
   currents having a predetermined phase difference are applied to the armature modules such that a thrust according to a traveling magnetic field is generated in a unit composed of S armature modules and P (P is a number corresponding to a multiple of 2) permanent magnet modules arranged in a moving direction, and
   a stator corresponding to one of the first member and the second member is fixed to the supporting mechanism such that a mover corresponding to the other is moved by the thrust.

2. The linear motor of claim 1, wherein in each armature module the coils wind round the salient poles such that an arbitrary salient pole is different from two neighboring salient poles in its polarity.

3. The linear motor of claim 1, wherein the peinianent magnets in each permanent magnet module are arranged such that an arbitrary peinianent magnet is different from two neighboring permanent magnets in its polarity.

4. The linear motor of claim 1, wherein the permanent magnets of each permanent magnet module are fixed to a surface of a magnetic body of the permanent magnet module or embedded in the magnetic body of the petinanent magnet module.

5. The linear motor of claim 1, wherein neighboring permanent magnet modules are separated from each other by a predetermine distance or have a nonmagnetic body interposed between the permanent magnet modules.

6. The linear motor of claim 1, wherein a cross-sectional structure of the aiinature module is symmetrical.

7. The linear motor of claim 6, wherein the magnetic body of the armature module has a circular ring shape or a polygonal ring shape.

8. The linear motor of claim 1, wherein the salient poles of each armature module are arranged on the magnetic body point-symmetrically or axisymmetrically.

9. The linear motor of claim 1, wherein the second member is located inside or outside the first member.

10. The linear motor of claim 9, wherein the salient poles of each armature module are formed inside the magnetic body when the second member is located inside the first member and the salient poles of each armature module are formed outside the magnetic body when the second member is located outside the first member.

11. The linear motor of claim 1, wherein a pipe is inserted into the permanent magnet modules in the moving direction to assemble the second member.

12. The linear motor of claim 1, wherein each permanent magnet in the permanent magnet module is different from two permanent magnets adjacent in the moving direction in its polarity.

13. The linear motor of claim 1, wherein a length of the first or second member is greater than a length of the unit composed of the S armature modules and the P permanent magnet modules.

14. The linear motor of claim 13, wherein S is determined by one of multiples of a constant that determines the predetermined phase difference, and is an odd number equal to or greater than 3.

15. The linear motor of claim 14, wherein the constant is 3 and (S, P) corresponds to one of (3, 2), (3, 4), (9, 8), and (9, 10).

16. The linear motor of claim 14, wherein if the constant is 3, S is 9, and three currents having a phase difference of 120° are respectively U, V and W, UVWUVWUVW or UuUVvVWwW are respectively applied to nine continuous armature modules (here, small letters represent phases opposite to those of currents represented by capitals).

17. The linear motor of claim 1, wherein the magnetic body of each armature module has a stratified form.

18. A linear motor comprising a first member including amature modules, a second member including magnetic modules, and a supporting mechanism,
   wherein each armature module has at least four salient poles projected from a ring-shaped magnetic body to the second member and coils winding round the salient poles, through which a single-phase current flows,
   each magnetic module has as many second salient poles as a number of the salient poles included in each armature module,
   currents having a predetermined phase difference are applied to the armature modules such that a thrust according to a traveling magnetic field is generated in a unit composed of S amature modules and P magnetic modules arranged in a moving direction, and
   one of the first member and the second member is fixed to the supporting mechanism such the other is moved while maintaining a predetermined gap between each salient pole and a second salient pole corresponding thereto.

* * * * *

UNITED STATES PATENT AND TRADEMARK OFFICE
CERTIFICATE OF CORRECTION

| | | |
|---|---|---|
| PATENT NO. | : 8,786,142 B2 | |
| APPLICATION NO. | : 13/498207 | |
| DATED | : July 22, 2014 | |
| INVENTOR(S) | : Houng Joong Kim | |

It is certified that error appears in the above-identified patent and that said Letters Patent is hereby corrected as shown below:

On the Title Page

(12)  Delete, "Lee", and insert -- Kim --.

(75)  Inventor should read: -- Houng Joong Kim, Seoul (KR) --.

Signed and Sealed this
Thirtieth Day of September, 2014

Michelle K. Lee
*Deputy Director of the United States Patent and Trademark Office*

UNITED STATES PATENT AND TRADEMARK OFFICE
CERTIFICATE OF CORRECTION

PATENT NO.       : 8,786,142 B2
APPLICATION NO.  : 13/498207
DATED            : July 22, 2014
INVENTOR(S)      : Houng Joong Kim It is certified that error appears in the above-identified patent and that said Letters Patent is hereby corrected as shown below:

Title page (73) Assignee should read: Sungjin Royal Motion Co., Ltd., Suwon-si (KR)

Signed and Sealed this
Twenty-third Day of February, 2016

Michelle K. Lee
*Director of the United States Patent and Trademark Office*

UNITED STATES PATENT AND TRADEMARK OFFICE
CERTIFICATE OF CORRECTION

PATENT NO.         : 8,786,142 B2
APPLICATION NO.    : 13/498207
DATED              : July 22, 2014
INVENTOR(S)        : Houng Joong Kim It is certified that error appears in the above-identified patent and that said Letters Patent is hereby corrected as shown below:

"Title page (73) Assignee should read: Sungjin Royal Motion Co., Ltd., Suwon-si (KR)"

(as corrected to read in the Certificate of Correction issued February 23, 2016) is deleted and patent is returned to its original state with the applicant & assignee name in patent to read --(73)   Assignee: Sunjin Royal Motion Co., Ltd.,
            Suwon-Si (KR)--

Signed and Sealed this
Seventh Day of June, 2016

Michelle K. Lee
*Director of the United States Patent and Trademark Office*